United States Patent [19]

Osborn

[11] Patent Number: 4,500,054

[45] Date of Patent: Feb. 19, 1985

[54] MOUNTING SYSTEM FOR COUPLED TURBOSHAFT GAS TURBINE ENGINES

[75] Inventor: Alfred W. Osborn, Harrow, England

[73] Assignee: Rolls-Royce Limited, London, England

[21] Appl. No.: 539,736

[22] Filed: Oct. 6, 1983

[30] Foreign Application Priority Data

Oct. 29, 1982 [GB] United Kingdom ............... 8231063

[51] Int. Cl.³ .................... B64D 27/00; B64D 27/16
[52] U.S. Cl. .................................. 244/54; 244/17.27; 248/554; 248/639; 60/39.31; 180/69.6
[58] Field of Search ............ 244/54, 55, 17.11, 17.27; 248/554–557, 639, 591, 564, 593, 595; 60/39.15, 39.31; 180/69.6

[56] References Cited

U.S. PATENT DOCUMENTS

| | | | |
|---|---|---|---|
| 1,664,129 | 3/1928 | Pallenberg | 248/591 |
| 2,324,542 | 7/1943 | Schan | 180/69.6 |
| 2,539,960 | 1/1951 | Marchant et al. | 244/54 |
| 2,718,756 | 9/1955 | McDowall | 248/554 |
| 2,828,607 | 4/1958 | Johnson | 248/554 |
| 3,180,426 | 4/1965 | Crim | 60/39.15 |
| 3,288,404 | 11/1966 | Schmidt et al. | 244/54 |
| 3,592,421 | 7/1971 | Kopp | 244/54 |
| 3,907,220 | 9/1975 | Amelio | 244/54 |

FOREIGN PATENT DOCUMENTS

| | | | |
|---|---|---|---|
| 1481637 | 1/1970 | Fed. Rep. of Germany | 244/54 |
| 2720957 | 11/1978 | Fed. Rep. of Germany | 244/54 |
| 1074067 | 6/1967 | United Kingdom | 244/54 |

*Primary Examiner*—Galen L. Barefoot
*Attorney, Agent, or Firm*—Cushman, Darby & Cushman

[57] ABSTRACT

A mounting system for two turboshaft gas turbine engines which are connected by a coupling gearbox. The mounting system comprises a front mounting attached to the gearbox which permits pivotal movement of the engine/gearbox assembly but restrains longitudinal movement and two strut members which support the engines vertically but provide no lateral or longitudinal support. The engines are interconnected by link members and an intermediate member rotatably attached to the vehicle which permit relative lateral movement between the engines but constrain any lateral movements of the engines which are in unison relative to the vehicle.

6 Claims, 5 Drawing Figures

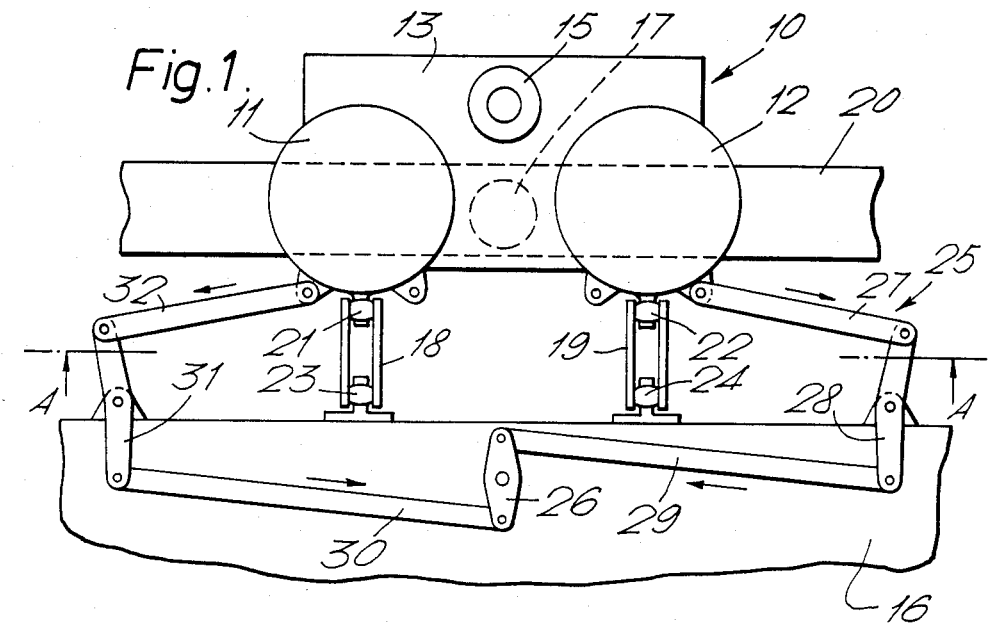
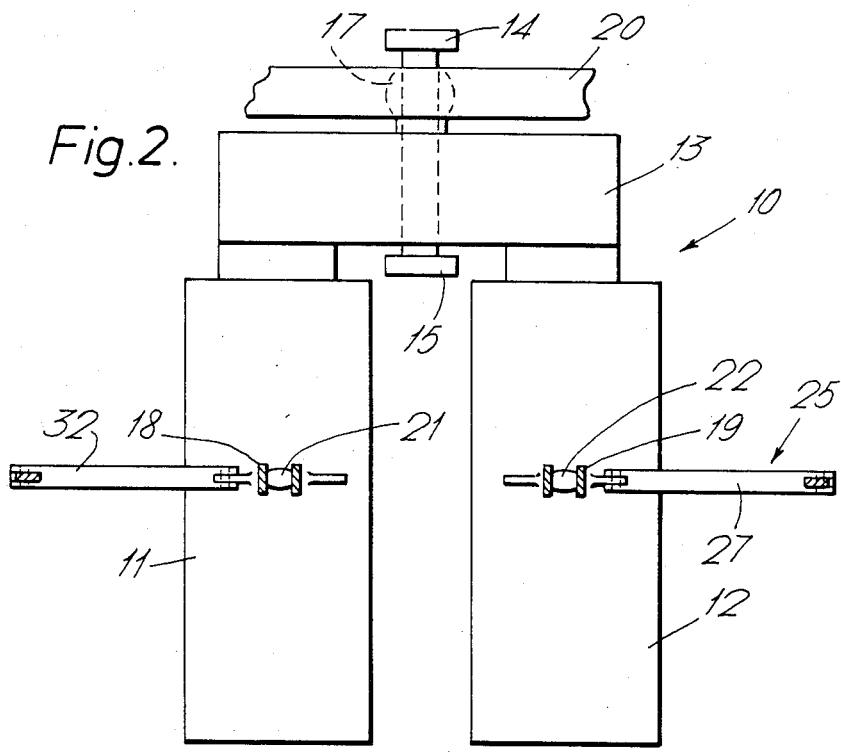

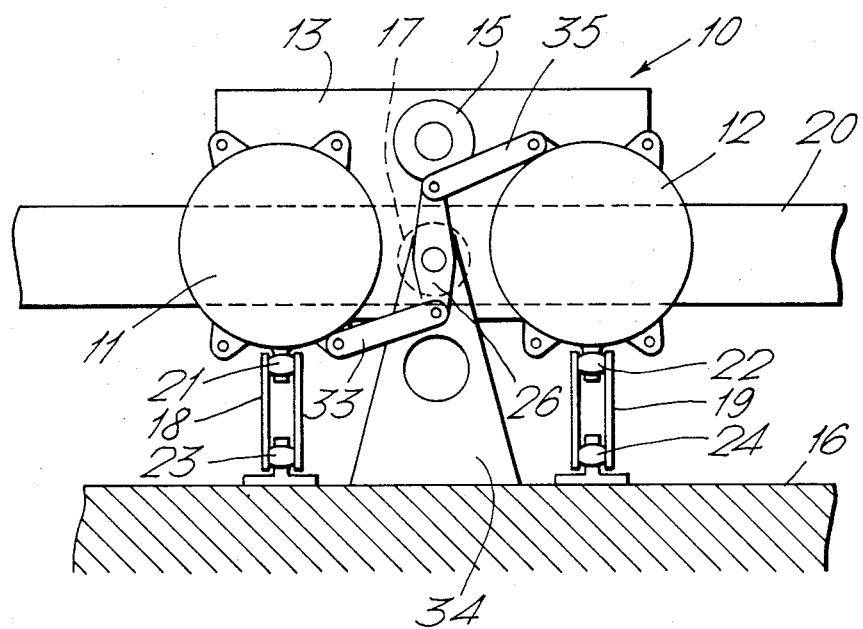

MOUNTING SYSTEM FOR COUPLED TURBOSHAFT GAS TURBINE ENGINES

This invention relates to a mounting system for coupled turboshaft gas turbine engines.

It is common practice on certain vehicles, such as helicopters, to provide a power unit which comprises two turboshaft gas turbine engines coupled by a common gearbox. Thus in the case of a helicopter application, the gearbox would have two drive outputs, one to the main rotor via the main transmission gearbox and the other to the tail rotor.

The coupling of turboshaft gas turbine engines in this manner can present difficulties associated with the mounting of the gearbox/engine assembly on the vehicle which it powers. Thus, for instance, during operation, the engines thermally expand, thereby exerting, via the mounting system, undesirable loads upon the vehicle. Another difficulty is that variations in the dimensions of engines and gearboxes can result in undesirable loads being imposed upon the vehicle via the mounting system in the event of one gearbox/engine assembly being replaced by another of slightly different dimensions.

It is an object of the present invention to provide a mounting system for coupled turboshaft gas turbine engines in which such difficulties are substantially avoided.

According to the present invention, a coupled turboshaft gas turbine engine/coupling gearbox assembly comprising first and second turboshaft gas turbine engines attached to a common coupling gearbox so that the longitudinal axes of the engines are parallel is mounted on a vehicle by a mounting system which comprises a mounting supporting said gearbox for pivotal movement of said assembly relative to said vehicle but which prevents longitudinal movement of said assembly relative to said vehicle, and first and second strut members which respectively support said first and second gas turbine engines from said vehicle, each of said strut members being pivotally attached to said vehicle and its respective gas turbine engine so as to permit lateral and longitudinal movement of each of said gas turbine engines relative to said vehicle, said gas turbine engines being interconnected with an intermediate member rotatably mounted on said vehicle by a plurality of link members, said link members interconnecting said gas turbine engines and opposite sides of said rotatably mounted member with respect to its axis of rotation in such a manner that any relative lateral movement between said gas turbine engines is unconstrained and results in said intermediate member being rotated about its axis of rotation by said link members but that all lateral movements of said gas turbine engines relative to said vehicle which are in unison are constrained by said link members and intermediate member.

The axis of rotation of said intermediate member may be generally parallel to the longitudinal axis of said gas turbine engines.

Said mounting supporting said gearbox from said vehicle may be a centrally positioned single spherical mounting.

The invention will now be described, by way of example, with reference to the accompanying drawings in which:

FIG. 1 is an end view of a coupled turbo shaft gas turbine engine/coupling gearbox assembly mounted on a vehicle by means of a mounting system in accordance with the present invention.

FIG. 2 is a view on section line A-A of FIG. 1.

FIG. 3 is a end view of an alternative arrangement of the mounting system shown in FIG. 2.

Figure 4:
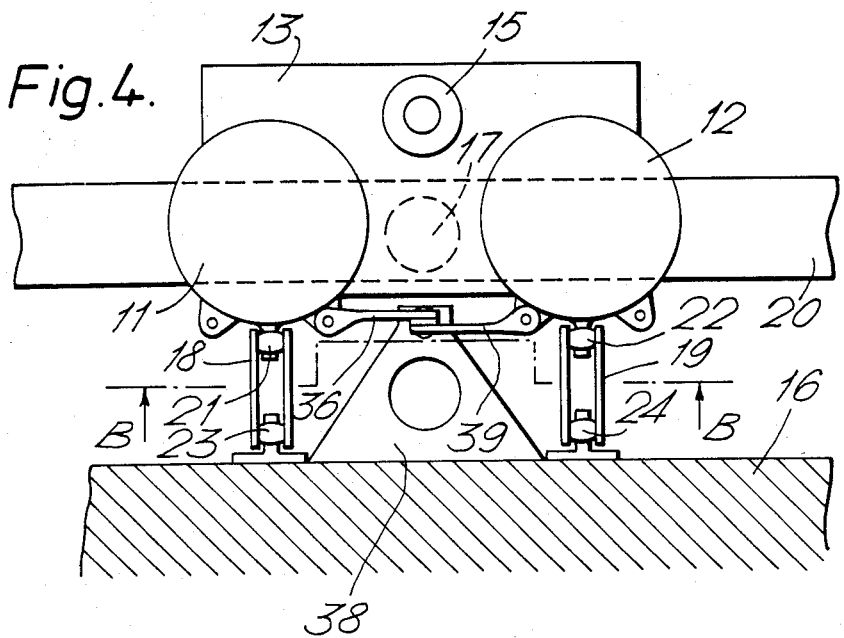
FIG. 4 is an end view of a further alternative arrangement of the mounting system shown in FIG. 2.

With reference to FIGS. 1 and 2, a coupled turboshaft gas turbine engine/coupling gearbox assembly generally indicated at 10 comprises first and second turboshaft gas turbine engines 11 and 12 which are attached to a coupling gearbox 13 so that the longitudinal axes of engine 11 and 12 are parallel. The outputs of the turboshaft engines 11 and 12 are combined by the coupling gearbox 13 to power two drive flanges 14 and 15 which in turn power the vehicle 16 which carries the engine/gearbox assembly 10. Thus in the case of the vehicle 16 being a helicopter, the drive flanges 14 and 15 would be used to power its main rotor via a suitable transmission gearbox (not shown) and its tail rotor.

The engine/gearbox assembly 10 is mounted on the vehicle 16 by a mounting system which comprises a front mounting 17 on the gearbox 13 and two strut members 18 and 19 which are respectively support the engines 11 and 12. The front mounting 17 is positioned mid-way across the gearbox 13 and is part spherical in shape to locate in a correspondingly shaped recess in a cross-member 20 which constitutes a part of the vehicle 16. The arrangement thus permits the engine/gearbox assembly 10 to pivot about the front mounting 17 but prevents longitudinal movement as the assembly 10.

Each of the strut members 18 and 19 is attached to the underside of its respective engine 11 and 12 by means of spherical bearings 21 and 22 and to the vehicle 16 by means of spherical bearings 23 and 24. The strut members 18 and 19 provide vertical support for the engine 11 and 12 but permit a certain degree of lateral and logitudinal movement of the engine 11 and 12 relative to the vehicle 16. Thus together, the front mounting 17 and the strut members 18 and 19 provide axial and vertical support for the engine/gearbox assembly 10 (with respect to the longitudinal axes of the engines 11 and 12) but permit a limited degree of lateral movement of the assembly 10 about the pivot defined by the mounting 17.

The engines 11 and 12 are interconnected with a rotatable intermediate member 26 by a plurality of link members 25 so that the link members 25 and intermediate member 26 limit the extent to which lateral movement of the engines 11 and 12 is permitted. More specifically the link members 25 and the rotatable intermediate member 26 permit relative lateral movement between the engines 11 and 12 but constrain any lateral movements of the engines 11 and 12 which are in unison relative to the vehicle 16.

The link members 25 comprise a link member 27 which is pivotally attached by means of spherical bearings to the underside of the engine 12 and to a link member 28 which is pivotally attached to the vehicle 16. The link member 28 is pivotally attached to a further link member 29 which is in turn pivotally attached to one side of an intermediate member 26 rotatably mounted on the vehicle 16 so that its axis of rotation is generally parallel to the longitudinal axes of the engines 11 and 12. The opposite side of the intermediate member 26 is pivotally attached to a link member 30 which is in turn pivotally attached to a link member 31 pivotally attached to the vehicle 16. The link member 31 is in turn pivotally attached by means of a spherical bearing to a link member 32 which is itself pivotally attached by means of a spherical bearing to the other engine 11.

The arrangement of the link members 25 and the rotatable member 26 is such that if the engines 11 and 12 move laterally with respect to each other so that they move apart, the link system 25 will be actuated so that its link members will translate in the directions indicated by the arrows shown in FIG. 1. This results in turn in the link members 29 and 30 rotating the intermediate member 26 in an anti-clockwise direction. Likewise if the engines 11 and 12 move laterally with respect to each other so that they move towards each other, the links members will translate in directions opposite to those indicated by the arrows in FIG. 1 so that the link members 29 and 30 rotate the intermediate member 26 in a clockwise direction. It is clear therefore that relative lateral movement between the engines 11 and 12 is unconstrained and merely results in the rotation of the intermediate member 26.

However if the engines 11 and 12 attempt to move laterally in unison relative to the vehicle 16, the link members 27 and 32 will attempt to move in the same direction as each other and this in turn results in the link members 29 and 30 attempting to move in the same direction as each other. However the intermediate member 26 prevents any movement of the link members 29 and 30 in the same direction as each other. Consequently any attempt by the engines 11 and 12 to move laterally in unison relative to the vehicle 16 will be constrained by the link members 25 and the intermediate member 26.

The mounting system constituted by the front mounting 17, the strut members 18 and 19, the link members 25 and the rotatable member 26 thus ensures that:

(a) any thermal expansion of the engines 11 and 12 results only in the pivoting of the struts 18 and 19 and movement of the link members 25 to accommodate lateral displacement of one engine relative to the other and also axial growth of the engines 11 and 12. Consequently such thermal expansion does not result in additional loads being imposed upon the vehicle 16.

(b) variations within manufacturing tolerances between different gas turbine engine/coupline gearbox assemblies 10 can be accommodated by pivoting of the struts 18 and 19, movement of the link members 25 and perhaps pivoting or swivelling of the front mounting 17. Consequently engine/gearbox assemblies 10 can be interchanged on a given vehicle 16 without additional loads being imposed upon the vehicle 16 as a result of dimensional variations between those assemblies 10.

In FIG. 3 there is shown an engine/gearbox assembly 10 which is similar to that shown in FIGS. 1 and 2 in that it is mounted on a vehicle 16 by a front mounting 17 and two strut members 18 and 19. It differs, however, in the manner in which the engines 11 and 12 are interconnected with each other. Thus the engine 11 has a link member 33 pivotally attached to its underside by means of a spherical bearing. The link member 33 is in turn pivotally attached by means of a spherical bearing to one side of a rotatable intermediate member 26 which is similar to that shown in FIG. 1 with the exception that it is mounted on a support member 34 which is attached to the vehicle 16. Thus the rotational axis of the intermedite member 26 is generally parallel to the longitudinal axes of the engines 11 and 12. The other side of the intermediate member 26 is pivotally attached by means of a spherical bearing to a link member 35 which is in turn pivotally attached by means of a spherical bearing to the upper-side of the other engine 12.

The arrangement shown in FIG. 3 provides all of the advantages of the arrangement shown in FIGS. 1 and 2 with the additional advantage of having fewer link members interconnecting the engines 11 and 12.

Figure 5:
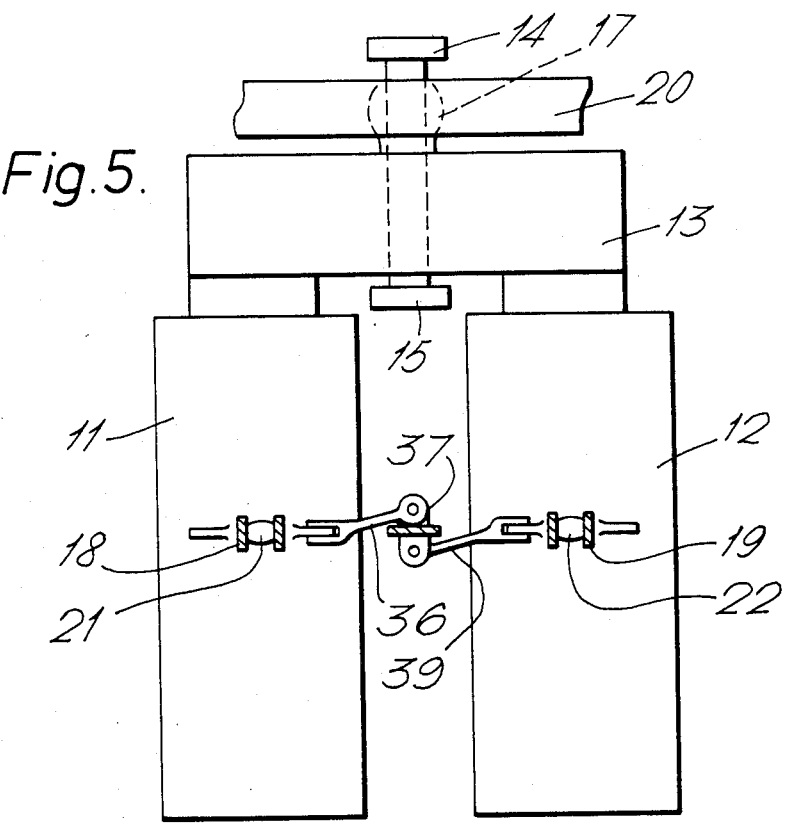
FIG. 5 is a view on section line B-B of FIG. 4.

The engine/gearbox assembly 10 shown in FIGS. 4 and 5 is also similar to that shown in FIGS. 1 and 2 but again differs in the manner in which the engines 11 and 12 are interconnected with each other. In this particular case, the underside of the engine 11 is pivotally attached by means of a spherical bearing to a link member 36 which is in turn pivotally attached to one side of a rotatable intermediate member 37 which is mounted on a support member 38 attached to the vehicle 16. The rotatable intermediate member 37 differs from that shown in FIG. 3 in that it is mounted so that its axis of rotation is generally normal to the plane which contains the longitudinal axes of the engines 11 and 12. The other side of the rotatable member 37 is pivotally attached by means of a spherical bearing to a link member 39 which in turn is pivotally attached by means of a spherical bearing to the underside of the engine 12.

The arrangement shown in FIGS. 4 and 5 provides the advantages of the arrangement shown in FIG. 3 with the additional advantage of having a more compact linkage between the engines 11 and 12.

It will be appreciated that although several different systems of providing an interconnecting linkage between the engines 11 and 12 have been disclosed, other systems could be provided in order to provide the desired effect of permitting relative lateral movement between the engines 11 and 12 but containing any lateral movement in unison relative to the vehicle 16.

I claim:

1. A coupled gas turbine engine/coupling gearbox assembly comprising first and second gas turbine engines, a coupling gearbox, said first and second gas turbine engines being attached to said coupling gearbox so that the longitudinal axes of said engines are parallel, a vehicle, and a mounting system mounting said assembly on said vehicle, said mounting system comprising a mounting supporting said gearbox for pivotal movement of said assembly relative to said vehicle but which prevents longitudinal movement of said assembly relative to said vehicle, and first and second strut members which respectively support said first and second gas turbine engines from said vehicle, each of said strut members being pivotally attached to said vehicle and its respective gas turbine engine so as to permit lateral and longitudinal movement of each of said gas turbine engines relative to said vehicle, said gas turbine engines being interconnected with an intermediate member rotatably mounted on said vehicle by a plurality of link members, said link members interconnecting said gas turbine engines and opposite sides of said rotatably mounted member with respect to its axis of rotation in such a manner that any relative lateral movement between said gas turbine engines is unconstrained and results in said intermediate member being rotated about its axis of rotation by said link members, but that all lateral movements of said gas turbine engines relative to said vehicle which are in unison are constrained by said link members and intermediate member.

2. A coupled gas turbine engine/coupling gearbox assembly as claimed in claim 1 wherein the axis of rotation of said intermediate member is generally parallel to the longitudinal axes of said gas turbine engine.

3. A coupled gas turbine engine/coupling gearbox assembly as claimed in claim 1 wherein said mounting supporting said gearbox from said vehicle is a centrally positioned single spherical mounting.

4. A coupled gas turbine engine/gearbox assembly as claimed in claim 1 wherein each of said gas turbine engines is interconnected with said intermediate member by a single link member.

5. A coupled gas turbine engine/gearbox assembly as claimed in claim 1 wherein said link members are attached to the undersides of each of said gas turbine engines.

6. A coupled gas turbine engine/gearbox assembly as claimed in claim 1 wherein said vehicle is a helicopter.

* * * * *